United States Patent [19]
Okamoto et al.

[11] Patent Number: 6,046,872
[45] Date of Patent: Apr. 4, 2000

[54] METHOD AND APPARATUS FOR RECORDING DIGITAL SIGNAL

[75] Inventors: Hiroo Okamoto; Hitoaki Owashi; Takaharu Noguchi; Kyoichi Hosokawa, all of Yokohama, Japan

[73] Assignee: Hitachi, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/207,915

[22] Filed: Dec. 9, 1998

Related U.S. Application Data

[63] Continuation of application No. 08/518,579, Aug. 15, 1995, Pat. No. 5,878,010.

[30] Foreign Application Priority Data

Aug. 26, 1994 [JP] Japan .................................. 6-201751
Aug. 26, 1994 [JP] Japan .................................. 6-201752
Oct. 28, 1994 [JP] Japan .................................. 6-264871

[51] Int. Cl.[7] ............................................ G11B 5/09
[52] U.S. Cl. ........................ 360/48; 360/53; 360/37.1; 360/39
[58] Field of Search .................... 360/48, 51, 39, 360/49, 53, 55, 40, 33.1, 35.1, 36.1, 36.2, 37.1; 386/46, 124, 68, 81, 98, 111, 112; 371/40.14, 40.1, 37.4; 369/42, 48, 50, 58, 59, 13, 275.3

[56] References Cited

U.S. PATENT DOCUMENTS 5,224,087  6/1993  Maeda et al. ............................. 369/54
5,768,298  6/1998  Nagai et al. ......................... 371/40.14

FOREIGN PATENT DOCUMENTS 5-174496  7/1993  Japan .

OTHER PUBLICATIONS

"Data Compression andn Digital Modulation," Nikkei BP, pp. 137–150.

*Primary Examiner*—Muhammad Edun
*Attorney, Agent, or Firm*—Evenson, McKeown, Edwards & Lenahan, P.L.L.C.

[57] ABSTRACT

Method and apparatus for recording and reproducing a digital signal, by which time information specifying to each packet an interval relative to the adjacent packet is added to a digital signal of a format in which packets of a fixed data length are arranged at unfixed intervals, the digital signal added with time information is recorded on a recording medium, a digital signal added with the above-mentioned time information is reproduced from the recording medium, and the digital signal is output in such a manner that the packets of the reproduced digital signal are arranged at intervals as same as recording intervals on the basis of the time information.

25 Claims, 15 Drawing Sheets

FIG. 1
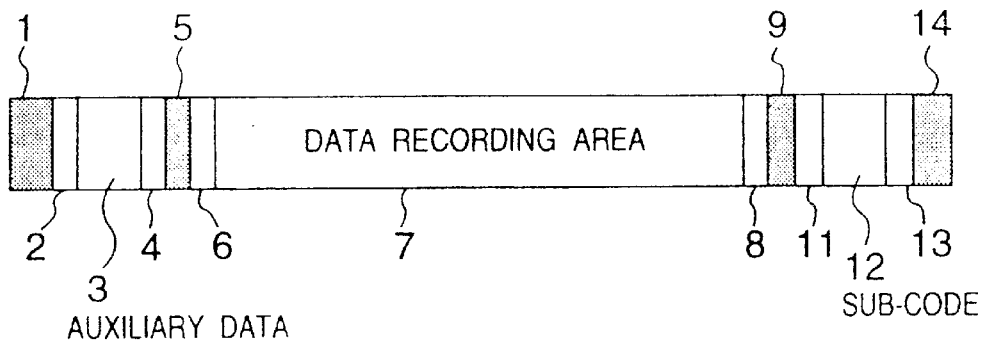
AUXILIARY DATA · SUB-CODE
FIG. 2A
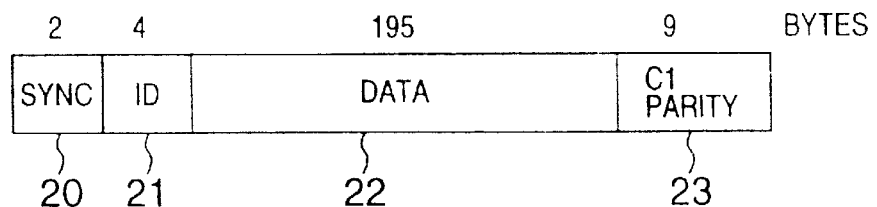
FIG. 2B
FIG. 3
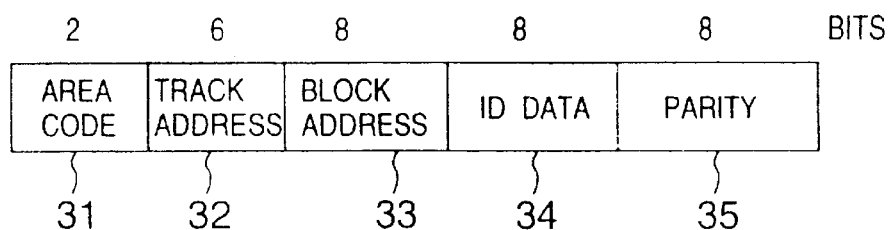

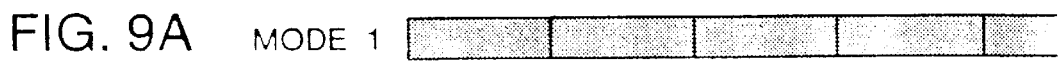
FIG. 9A  MODE 1
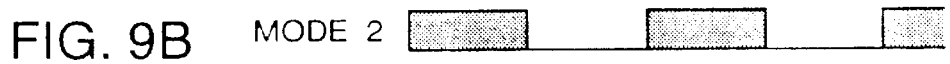
FIG. 9B  MODE 2
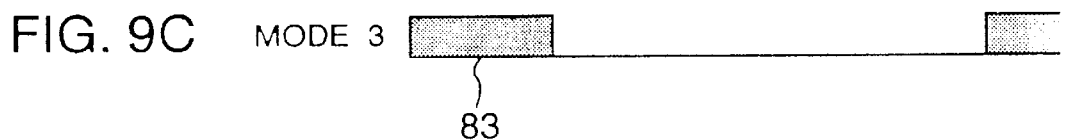
FIG. 9C  MODE 3
FIG. 10
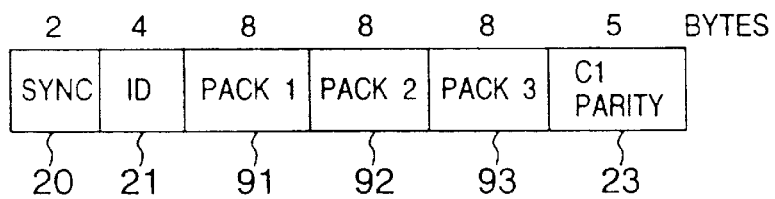
FIG. 11
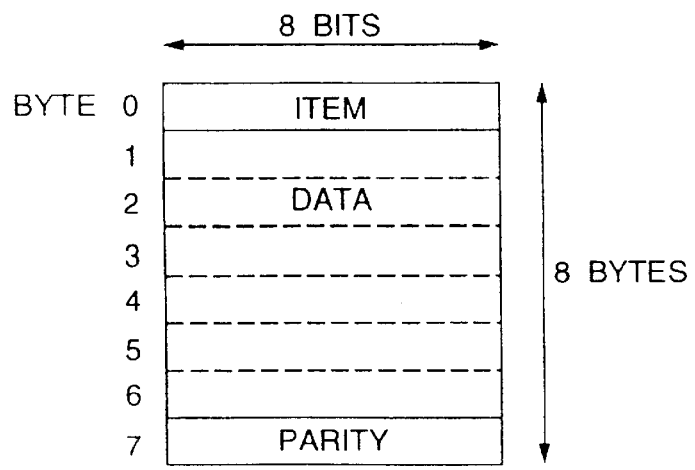

METHOD AND APPARATUS FOR RECORDING DIGITAL SIGNAL

This application is a constitution of application Ser. No. 08/518,579, filed Aug. 15, 1995 now U.S. Pat. No. 5,878,010.

BACKGROUND OF THE INVENTION

This invention relates to a method and an apparatus for recording, on a recording medium such as a magnetic tape, a received signal of a digital broadcasting or a digital output signal from another digital video tape recorder.

In digital television broadcasting, a digital signal which has gone through an information compression process is transmitted. For efficient use of the transmission line, the transmission rate of the digital signal differs with the kinds of video sources, and even in the transmitted digital signal of the same image source, the transmission rate varies from moment to moment.

The digital video tape recorder converts an analog video signal into a digital signal, and records the video signal on a magnetic tape in the form of a digital signal. The transmission rate of the output digital signal of the digital video tape recorder differs from the transmission rate of the transmitted signal of digital television broadcasting.

A digital signal recording apparatus for recording a compressed digital video signal on a magnetic tape with a rotary head is revealed in Japanese Patent Application Laid-Open No. JP-A-5-174496.

Apparatus for recording on a recording medium a compressed digital signal in which the transmission rate and the data intervals are unfixed has not been developed. Nor has a recording method been developed which can selectively record signals of different transmission rates in a single recording apparatus.

A home use digital video tape recorder for recording a compressed digital video signal on a magnetic tape with a rotary head is reported in pages 137 to 150 of "Data Compression and Digital Modulation" published by Nikkei BP. This home use digital video tape recorder uses a high-performance metal-evaporated tape on a special-purpose cassette, and records a compressed digital video signal of 24.948 Mbps and digital audio signals of two channels (1.536 Mbps) at the head rotating speed of 9,000 rpm and at the recording rate of 41.85 Mbps. Signals of such high transmission rates cannot be recorded by the prior art on a conventional analog VTR in general use. The reason is that since the rotary head speed of the analog signal VTR is 1,800 rpm and an oxide tape is used, it is difficult to record a digital signal at a recording rate of 20 Mbps or higher. In addition, the cassette for the analog VTR is in a shape different from that of the digital VTR written in the above-mentioned literature.

SUMMARY OF THE INVENTION

An object of the present invention is to provide digital signal recording method and apparatus for recording a compressed digital video signal in which the data transmission rate and the data intervals are unfixed as in digital television broadcasting, for example.

Another object of the present invention is to provide digital signal recording method and apparatus capable of recording signals different in the transmission rate and in the format of recording signal, such as the packet size on a single apparatus.

Yet another object of the present invention is to provide digital signal recording method and apparatus for recording a digital signal of a high transmission rate on an ordinary analog signal VTR.

According to an aspect of the present invention, a digital signal of a format in which fixed-length packets are arranged at irregular intervals is added with time information specifying to each packet an interval relative to the adjacent packet, the digital signal added with time information is recorded on a recording medium, the digital signal added with time information is reproduced from the recording medium, and the digital signal is output so that the packets of the reproduced digital signal are arranged at fixed intervals on the basis of the time information.

According to another aspect of the present invention, the digital signal is divided into pieces of data of a specified data length, and blocks are generated by adding a synchronizing signal, control signals and an error correcting code to each of the pieces of data, and a specified number of blocks are recorded in each signal recording unit area on the magnetic recording medium. The control signal added to each block includes a first control signal showing the operation mode when the block was recorded and a second control signal showing the contents of the digital signal recorded in the signal recording unit area.

According to a further aspect of the present invention, each block is generated by adding a sync signal, control signals and an error correcting code to m bytes (m is a positive integer) of digital signal of a packet type in which a packet is formed by n bytes (n is a positive integer) of data, and a specified number of blocks are recorded in each signal recording unit area on a magnetic recording medium. And, the values of n and m are set so that n:m=n':m' (where n'<n and m'<m), and m' packets are arranged in n' blocks, and recorded on the recording medium.

According to yet another aspect of the present invention, each block is generated by adding a sync signal, control signals and an error correcting code to m bytes (m is a positive integer) of digital signal of a packet type in which a packet is formed by n bytes of data (n is a positive integer), and a specified number of blocks are recorded in a signal recording unit area on a magnetic recording medium. And, the control signal includes information for identifying the value of the above-mentioned number n of bytes of a packet.

According to a still further aspect of the present invention, there is provided a recording apparatus for simultaneously recording signals on a plurality of tracks by a plurality of rotary heads, wherein a digital signal is divided into data units of fixed data lengths, a sync signal, control signals and an error detecting and correcting code are added to each of the data units to thereby change said data units into blocks, and a specified number of said blocks are recorded on a recording area on a track of a magnetic recording medium by said rotary heads, wherein each said rotary head includes at least four magnetic heads, and wherein at least a first digital signal of 25 Mbps and a second digital signal of 1.6 Mbps are recorded simultaneously by two magnetic heads, each operating at a recording rate of 20 Mbps or less.

Other objects and effects of the present invention will become apparent by reading the following description with reference to the accompanying drawings.

BRIEF DESCRIPTION OF THE DRAWINGS

FIG. 1 is a diagram showing a recording pattern of a track according to an embodiment of the present invention;

FIGS. 2A and 2B are composition diagrams of blocks of recording areas of the recording pattern;

FIG. 3 shows the composition of ID data 21;

FIGS. 9A, 9B and 9C are operation timing diagrams in the respective modes in recording;

FIG. 10 shows the composition of data 22 in a sub-code recording area 12;

FIG. 11 shows the composition of each of the packs 91 to 93;

DESCRIPTION OF THE PREFERRED EMBODIMENTS OF THE INVENTION

Figure 4:
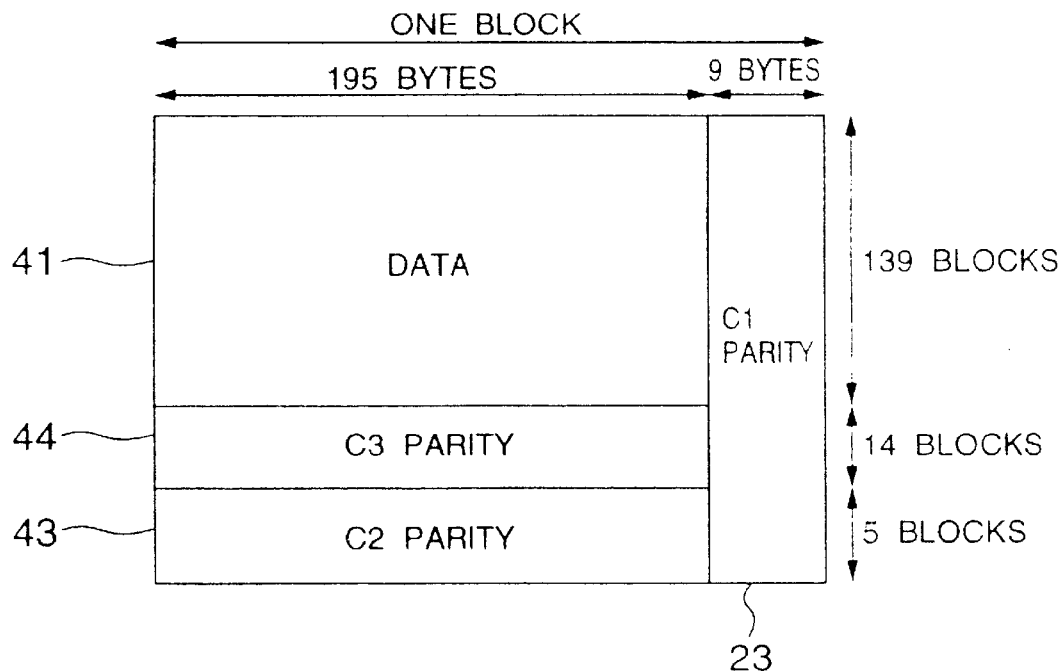
FIG. 4 shows the composition of data for one track in a data recording area.

Preferred embodiments of the present invention will be described with reference to the accompanying drawings.

FIG. 1 is a recording pattern of a track. Reference numeral 3 denotes an auxiliary data recording area for audio signal, etc., 7 denotes a data recording area for recording a compressed digital video signal, 12 denotes a sub-code recording area for recording a sub-code for time information, program information, etc., 2, 6 and 11 denote preambles to the respective recording areas, 4, 8 and 13 denote postambles to the respective recording areas, 5 and 9 denote gaps between the recording areas, and 1 and 14 denote margins at the ends of a track. By using the preambles and the postambles of the recording areas, postrecording can be performed separately for the respective recording areas. Needless to say, digital signals other than the compressed digital video signal and the audio signal may be recorded in the recording areas 3 and 7.

FIGS. 2A and 2B show the compositions of blocks of the respective recording areas. Reference numeral 20 denotes a sync signal, 21 denotes ID information, 22 denotes a video signal or auxiliary data, and 23 denotes parity (C1 parity) bytes for error detection and correction. The sync signal 20 consists of two bytes, the ID information 21 consists of four bytes, the data 22 consists of 195 bytes, and the parity consists of nine bytes. Hence, one block consists of 210 bytes. FIG. 2B shows the composition of a block of the sub-code recording area 12. In the block of the sub-code recording area, the sync signal 20 and the ID information 21 respectively consist of the same number of bytes as in FIG. 2A, the data 22 consists of 24 bytes, and the parity 23 consists of five bytes, so one block consists of 35 bytes, which is ⅙ of 210 bytes in FIG. 2A. By making arrangements such that the number of bytes of one block differs in the ratio of integers between those two types of recording areas, and the sync signal 11 and the ID information 12 have common compositions in all the recording areas, the generation of blocks in recording, and the detection or the like of a sync signal and ID information in recording can be processed by the same circuit.

FIG. 3 shows the composition of ID information 21. Reference numeral 32 denotes a track address, 33 denotes a block address in the track, 34 denotes an ID data, 35 denotes parity data to detect errors in the area code 31, the track address 32, the block address 33 and the ID data 34. The area code 31 is used to identify the areas. For example, "00" is assigned to the data recording area 7, "10" is assigned to the auxiliary data area 3, and "11" is assigned to the sub-code recording area 12. For the data recording area 7 or the like, codes of a plurality of kinds, "00" and "01", for example, may be assigned to discriminate different kinds of data, including data for reproduction at variable speeds. Track addresses 32 are used to discriminate among tracks, and can be made to change at every track or every two tracks, for example. In this case, 64 tracks or 128 tracks can be identified by 6-bit addresses. Block addresses 33 are used to discriminate among the blocks in each recording area. For instance, the block addresses range from 0 to 157 for a data recording area 7, from 0 to 13 for an auxiliary data area 3, and from 0 to 17 for a sub-code recording area 12.

The track addresses 32 are used to discriminate among third error correcting codes to be described later, and the track addresses 32 can be made to repeat every 12 tracks or every 12's multiple of tracks, for example.

C1 parity data 23 is added to an area code 31, a track address 32 and a block address 33 in data 22 and ID information 21, for example. By this method, the capability of detecting a block address or the like in reproduction can be improved.

FIG. 4 shows the composition of data for one track in a data recording area 7. Note that a sync signal 20 and ID information 21 are omitted. A data recording area includes 158 blocks, and data 41 is recorded in the first 139 blocks, a third error correcting code (C3 parity) 44 is recorded in the next 14 blocks, and a second error correcting code (C2 parity) 44 is recorded in the last 5 blocks.

C2 parity data 43 adds C2 parity data of five bytes to data of 139 bytes and C3 parity data of 14 byte in every track. C3 parity data 44 adds, in every 12 tracks for example, C3 parity data of seven bytes each to even number blocks and odd number blocks, which are two halved groups of blocks of a 139-block data. As the error correcting code, a Reed-Solomon code may be used.

Figure 5:
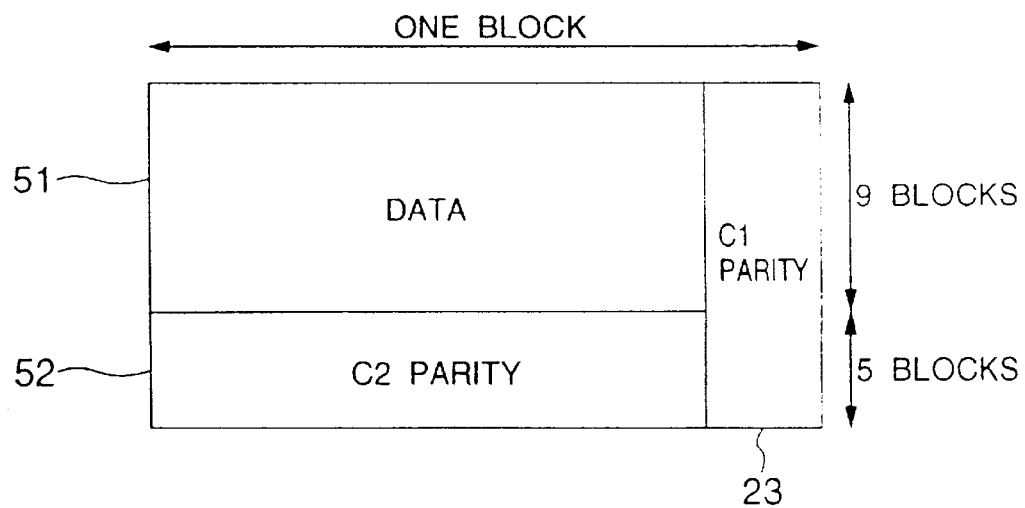
FIG. 5 shows the composition of data for one track in an auxiliary data recording area 3.

FIG. 5 shows the composition of data for one track in an auxiliary data recording area 3. Note that a sync signal 20 and ID information 21 are omitted. An auxiliary data recording area 3 consists of 14 blocks, and information 51 related to the video signal, such as the audio signal, is recorded in the first nine blocks. A second error correcting code (C2 parity) 52 is recorded in the subsequent five blocks. Parity data 52 adds five parity bytes to data of nine bytes like in a data recording area 7. In this way, by using the same number of bytes for a C2 parity as in a data recording area 7, it becomes possible to use a common parity check process. Note that a third error correcting code is not added to an auxiliary data recording area, but this is because in the case of the audio signal, for example, by dispersing even-number data and odd-number data on different tracks, even if errors occur in all data on one track, the errors can be corrected efficiently by mean value interpolation. Needless to say, a third error correcting code may be added to this area.

Figure 6:
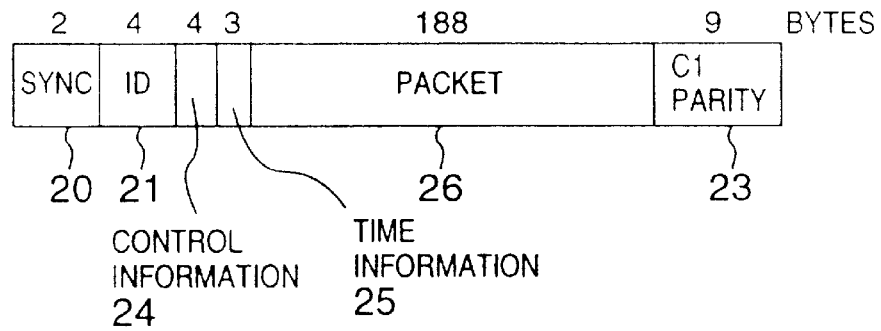
FIG. 6 shows the composition of a block of compressed digital video signal when the signal transmitted in the form of a packet is recorded in a data recording area 41.

FIG. 6 shows the composition of a block when a compressed digital video signal transmitted in the form of a packet is recorded in a data recording area 41. One hundred ninety-five bytes of data consist of four bytes of control information 24 related to data, three bytes of time information 25, and 188 bytes of packet data 26.

If data is recorded in such a format that a packet of data corresponds to a block, that is, to a sequence of codes including C1, when an uncorrectable error occurs within a block due to a burst error caused by drop-outs or the like, the error is prevented from extending over two or more packets, which are units of data transmission. It ought to be noted that though a packet is specified above as having 188 bytes, if a packet is shorter than this, dummy data may be added when a packet of data is recorded, or the area for control information may be increased, or otherwise the short packet may be recorded as it is without making any attempt to let a packet be in one-to-one correspondence to a block. This applies to a case where a packet is longer than 188 bytes.

Time information 25 is information about time of transmission of packets. To be more specific, time when a packet (start) is transmitted is counted, and time intervals between packets are counted by a base clock, the count value is recorded together with packet data, and on the basis of this time information, the intervals between the packets are set for reproduction, so that data can be output in the same form as it was transmitted.

Control information 24 concerns packet data 26, such as content of data, recording time, copy control information, etc. This information is recorded in units of four bytes for a block or 4×n bytes for n blocks. To give an example, if recording is performed in units of eight bytes for two blocks, data can be recorded in the same form as packs of a sub-code to be described later.

Figure 7:
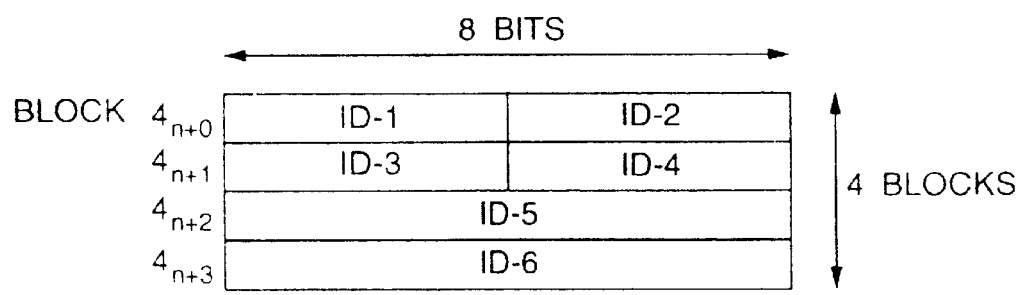
FIG. 7 shows the composition of ID data in a data recording area 7.

FIG. 7 shows the composition of ID data 34 in a data recording area 7. In ID data 34, a piece of information is composed of four bytes from four blocks, for example. This ID data is multiplex-recorded two or more times to improve the detectability of information in reproduction. Data composed of four blocks consists of six kinds of data, ID-1 to ID-6.

Figure 8:
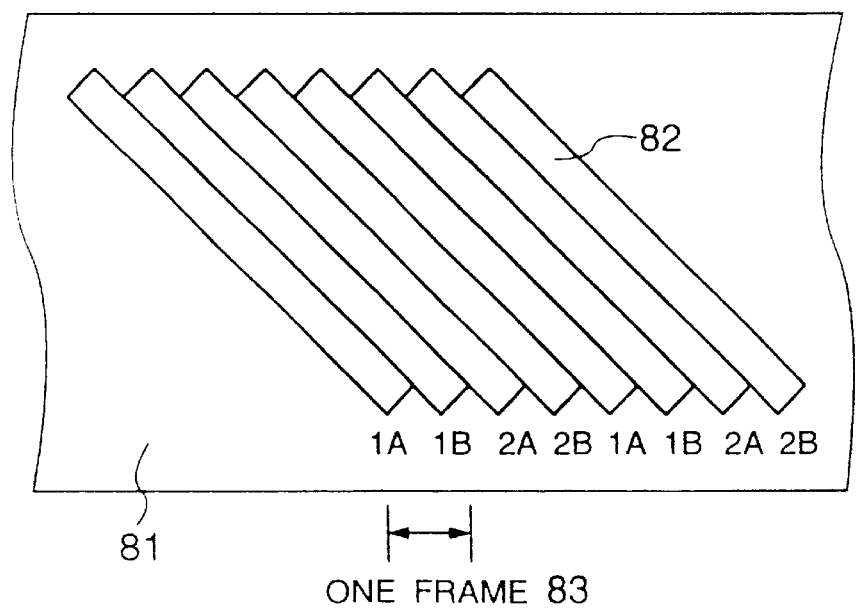
FIG. 8 is a diagram showing recording patterns (tracks) on a tape.

ID-1 indicates the recording format of the data recording area 7. By varying the value of ID-1, ID-1 can handle a plurality of kinds of formats. For example, when recording a compressed digital video signal of a packet form shown in FIG. 6, "1" is set in ID-1. ID-2 indicates a recording mode, that is, the maximum recording rate. In this embodiment, in two-channel recording at a rotating speed of 1800 rpm by a rotary head with four heads, data can be recorded at a bit rate of about 25 Mbps. FIG. 8 shows a recording pattern on the tape in this case. Reference numeral 81 denotes a tape, and 82 denotes one track as shown in FIG. 1. Symbols 1A, 1B, 2A and 2B denote four recording heads. Two tracks (one frame) are recorded by ½ (180*) of one rotation of the rotary head.

FIG. 9A shows mode 1 in which data is recorded on four tracks in one rotation of the cylinder with four heads. In mode 1, data can be recorded on tape at a recording rate of about 25 Mbps. As shown in mode 2 in FIG. 9B, if recording is performed every other half rotation (two tracks for one rotation), the recording rate will be about 12.5 Mbps. As shown in mode 3 in FIG. 9C, if recording is performed for a half rotation in every four half-rotations (two tracks for two rotations), the recording rate will be about 6.2 Mbps. In this case, if the tape feed speed is reduced to ½ or ¼, the track patterns on the tape will become substantially the same. In like manner, the maximum recording rate can be reduced to 1/n of 25 Mbps. In recording, the transmission rate of data to be recorded is selected and the most adequate recording mode is set for recording. The mode in which data was recorded is stored in ID-2. For example, "1" (mode 1) is set for 25 Mbps, "2" (mode 2) is set for 12.5 Mbps, and "3" (mode 3) is set for 6.25 Mbps.

ID-3 indicates a time base compression mode, that is, the time base compression rate in recording. This mode is applicable to a system in which a digital signal is transmitted in short time by compressing the time base, and after recording, the digital signal is reproduced by expanding the time base. For example, "1" is set when the time base is not compressed, "2" is set when the time base compression rate is twice higher than normal, and "3" is set when the time base compression rate is four times higher than normal.

ID-4 indicates the number of channels for simultaneous recording of data. To give an example, in the recording mode 1, data of 12.5 Mbps can be recorded in two channels.

ID-5 indicates the number of packets (number of blocks) to be recorded on one track, and ID-6 indicates the packet length of packets on which data is recorded. By controlling the amount of data recorded on one track in packet (block) units and storing the number of packets recorded, it is possible to comply with any transmission rate. It is required to perform the above-mentioned control on every track or every certain number of tracks. By storing the packet length, it is possible to comply with packets of any lengths.

As has been described, by controlling the recording mode according to the transmission rate of data to be recorded and also controlling the amount of data to be recorded on one track, efficient recording can be performed by a single recording/reproducing process. In reproduction, it is required to detect ID data 34 to identify the recording mode, and set the reproducing process circuit in that mode for reproduction.

If packets and blocks are not arranged so as to correspond to one another, and if the address of the last block is recorded in ID-5 and the location of the last data is recorded in ID-6, then the amount of data to be recorded can be controlled in byte units.

ID data 34 in an auxiliary data recording area 3 may have the same composition as shown in FIG. 7. In an auxiliary data recording area 3, auxiliary data of about 1.6 Mbps can be recorded in the recording mode 1. For example, PCM audio signal can be recorded in two channels at a quantization frequency of 48 kHz and at a quantization bit number of 16 bits.

ID data 34 of a sub-code recording area 12 has recorded therein a start flag to indicate the start of a problem, a flag for a skip reproduction, etc. In a subcode recording area 12, unlike in a data recording area 7 and an auxiliary data recording area 3, the same data is recorded in all blocks in one frame. In this way, the detection performance in high-speed search or the like can be improved.

FIG. 10 shows the composition of data 22 in a sub-code recording area 12. In FIG. 10, data is recorded in packs 91, 92 and 93, each pack being eight bits long. Parity data 23 consists of five bytes. In this parity data 23, by using the same number of bytes as in C2 parity of a data recording area 7 of an auxiliary data recording area 3, it is possible to use a common parity check process.

FIG. 11 shows the composition of each of the packs 91, 92 and 93. Byte 0 is an item to show the contents of information to be recorded in a pack. By switching over the item, a plurality of kinds of information can be recorded. Byte 7 is a parity byte to detect errors in pack data.

Description will now be made of an embodiment of the present invention for recording an output digital signal from a home use digital VTR discussed in pages 137 to 150 of "Data Compression and Digital Modulation" published by Nikkei PB. By using a recording format dedicated to recording from a home use digital VTR, efficient recording can be performed. In recording, if for example "2" is set in ID-1 in FIG. 7, this format can be discriminated from the ordinary recording format.

Figure 12:
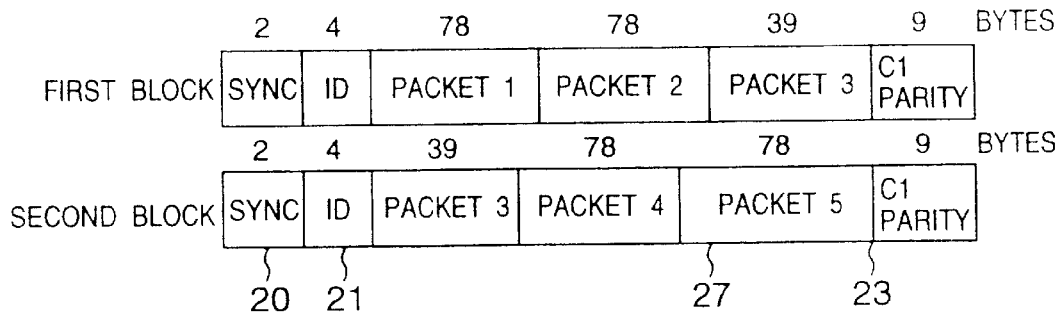
FIG. 12 shows the compositions of the data recording areas 41 and 51 when a signal of a home use digital VTR is recorded.
Figure 13:
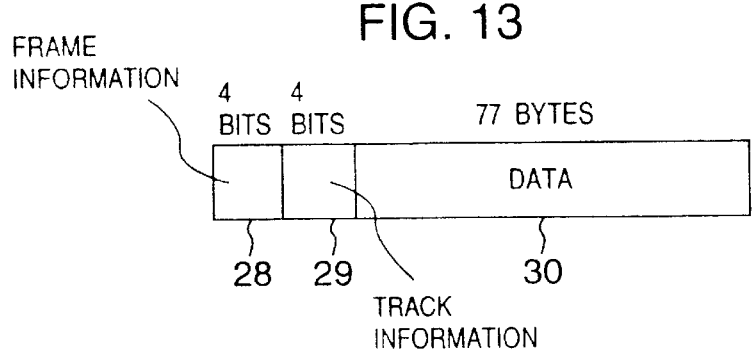
FIG. 13 shows the composition of a packet 27.

FIG. 12 shows the compositions of blocks of data recording areas 41 and 51. In a home use digital VTR, one block consists of 77 bytes. Therefore, each packet 27 is constituted by 78 bytes, that is, 77 bytes of data 30 and one byte for frame information 28 and track information 29, and five packets are recorded in two blocks. Frame information 28 and track information 29 is used to identify a frame on a home use digital VTR and a track in a frame, namely, what track number. It goes without saying that information other than mentioned above can be added.

By recording five packets in two blocks as described, efficient recording can be performed. Furthermore, by having frame information 28 and track information 29 added, a desired frame or track can be accessed easily in reproduction. To be more specific, when data is recorded in a recording apparatus according to this embodiment, a desired frame or track can be reproduced by detecting frame information 28 and track information 29 from data in reproduction without arranging one-to-one correspondence between the frames and tracks on the home use digital VTR, and the recording locations in the recording apparatus according to the present invention.

Figure 14:
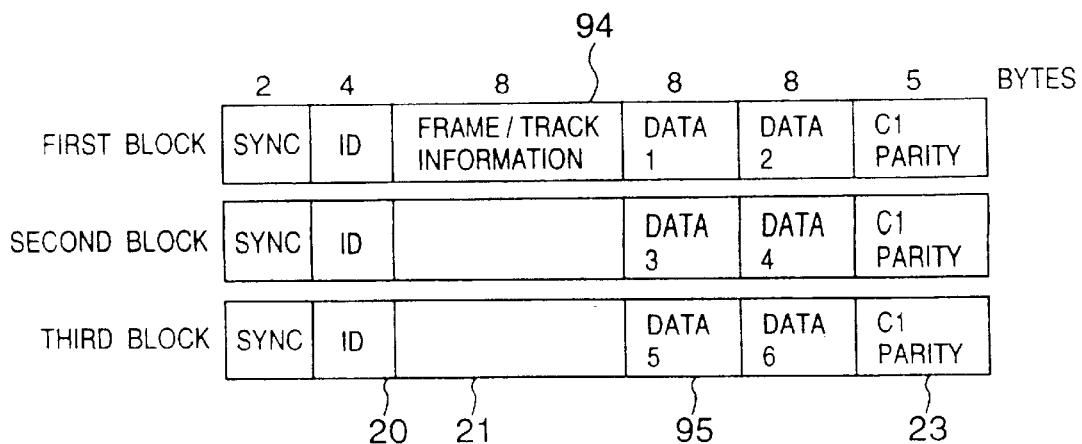
FIG. 14 shows the compositions of blocks in a sub-code recording area 12 when a signal of a home use digital VTR is recorded.
Figure 15:
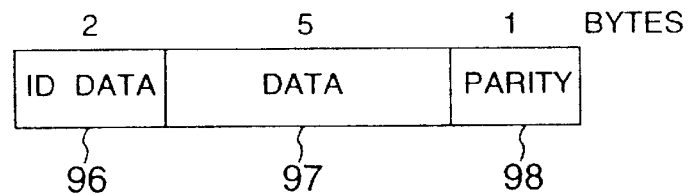
FIG. 15 shows the composition of a data recording area 95.

The conventional home use digital VTR performs one-channel recording at a rotary head speed of 9000 rpm. Therefore, it is necessary to record data, which correspond to five tracks of the conventional home use digital VTR, in two tracks of a recording apparatus according to the present invention. In the conventional digital VTR, data recorded on one track includes 135 blocks of digital video data, three blocks of auxiliary data related to the digital video data, nine blocks of audio data, and 12 blocks of sub-code data. In other words, 675 blocks of digital video information, 15 blocks of additional information of the digital video information, 45 blocks of audio information and 60 blocks of sub-code information are recorded in each five tracks. When data in the format as mentioned above is recorded by a recording apparatus according to the present invention, the digital video signal for five tracks are so arranged as to correspond to two tracks recorded with heads A and B. The digital video signal is recorded in 270 blocks on two tracks, that is, at block addresses 1 to 135 in a data recording area 7 on each track. Auxiliary data is recorded in 6 blocks on two track, that is, at block addresses 136 to 138 in a data recording area 7 on each track. The audio signal is recorded in 18 blocks on two tracks, that is, at block addresses 0 to 8 in an auxiliary data recording area 3 on each track. Other ID information or the like is recorded at block address 0 in the data recording area 7. Sub-code information consists of five bytes of data in a block. To this sub-code information, ID information related to the sub-code information and parity data for error detection is added, thus mounting to a total of eight bytes of data as shown in FIG. 15. The eight bytes of sub-code data are recorded in a sub-code recording area 12 as shown in FIG. 14. The sub-code data is recorded in 30 blocks on two tracks, that is, at block addresses 0 to 14 on each track. In that portion of each sub-code area which remains blank, information for access in high-speed search such as time information, program information, etc. is recorded.

By recording audio information and sub-code information in an auxiliary data recording area 3 and a sub-code recording area 12, respectively, after-recording of audio signal or sub-code information, high-speed search and so on can be performed even when a digital signal output from a home use digital VTR was recorded.

Figure 16:
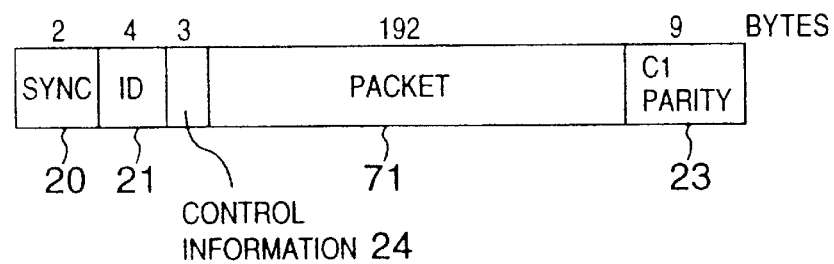
FIG. 16 is a diagram showing another example of composition of a block of a compressed digital video signal when the signal transmitted in the form of a packet is recorded in a data recording area 41.
Figure 17:
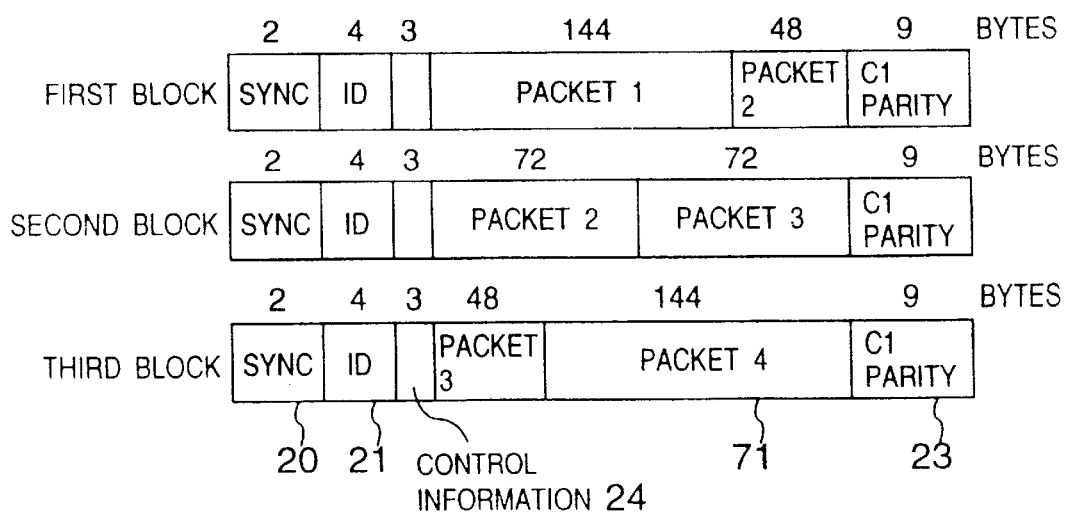
FIG. 17 shows the compositions of blocks when a packet 71 is 144 bytes long.
Figure 18:
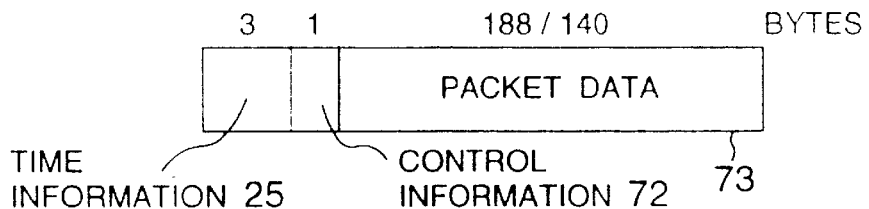
FIG. 18 shows the composition of a packet 71.

FIG. 16 is another example of composition of a block when a compressed digital video signal transmitted in the form of a packet is recorded in a data recording area 41. One hundred and ninety-five bytes of data consist of three bytes of control information 24 related to data and 192 bytes of a packet 71, for example. Like in the case in FIG. 6, control information 24 is recorded in units of three bytes for every block or 3×n bytes for every n blocks. FIG. 17 shows the compositions of blocks when a packet 71 is 144 bytes long. In this case, four packets 71 are recorded in three blocks. FIG. 18 shows the composition of a packet 71 in FIG. 16 or 17. A packet 71 consists of, for example, three bytes of time information 25, one byte of control information related to the packet, and 188 or 140 bytes of packet data 73. If the number of bytes of the packet data 73 is smaller than this, say, 130 bytes, for example, dummy data may be added in recording, or the area for control information may be increased.

If the ratio of the number of bytes in a packet to the number of bytes of a recording area in a block is arranged so as to be a simple integral ratio of n:m and m packets are recorded in n blocks, data can be recorded efficiently even when the packet length differs from the recording area of a block. And, if n and m are smaller values than the number of bytes of a packet and the number of bytes of a recording area in a block, respectively, and if they can be expressed by integers of about ten or less, data can be processed easily. It ought to be noted that when the length of a packet is longer than the recording area of a block (n>m), recording can be performed similarly. In addition, when packets differ in length, if information such as time information is given in a common form, recording and reproducing processes can be carried out easily. Packets of different lengths can be identified by the recording format of ID-1 or by the packet length of ID-6 in FIG. 7.

When m packets are recorded in n blocks, if the number of blocks in a recording area is arranged as a multiple of n, the packet to be recorded on one track can be managed easily. For example, in the case of FIG. 17, it is required to set 138 blocks as the number of blocks in a data recording area 7 in which data is recorded. In this case, 184 packets can be recorded on one track. The remaining one block may be left not recorded or may have some other information recorded therein.

Figure 19:
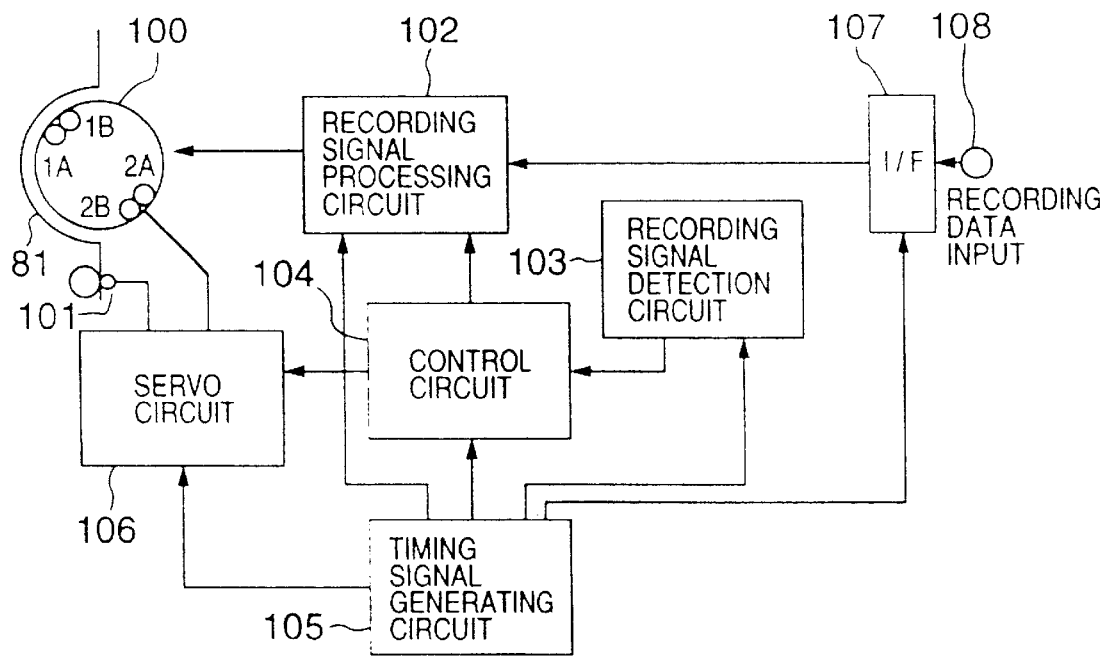
FIG. 19 is a block diagram of the digital signal recording apparatus for recording by a recording method according to the present invention.

FIG. 19 is an embodiment of the digital signal recording apparatus for recording by the recording method according to the present invention. Reference numeral 100 denotes a rotary head, 101 denotes a capstan, 102 denotes a recording signal processing circuit to generate a recording signal in FIG. 1, 103 denotes a recording signal detection circuit to detect the transmission rate, kind, etc. of the recording signal, 104 denotes a control circuit, such as a microprocessor, to control the recording mode, etc. according to a result of detection in the recording signal detection circuit 103, 105 denotes a timing signal generating circuit to generate a timing signal as the basis for the rotation, etc. of the rotary head 100, 106 denotes a servo circuit to control the speed of the rotary head and tape feed, and 107 denotes an interface circuit.

Figure 20:
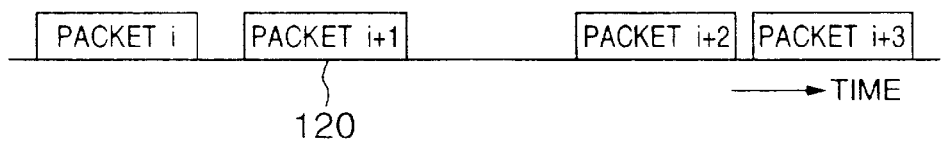
FIG. 20 is a timing diagram in recording packet data.

From the input terminal 108, packet data 120 is input at unfixed intervals in such an order as packet i, packet i+1, packet i+2, and packet i+3 (i is an integer) in that order as shown in FIG. 20. The packet data 120 input from the input terminal 108 is supplied to the recording signal detection circuit 103 through the interface circuit 107. The recording signal detection circuit 102 detects the maximum transmission rate, the kind, etc. of packet data from information added to the packet data or information sent here separately, and outputs a detection result to the control circuit 104. The control circuit 104 decides the mode in which data was recorded from the detection result, and sets the operation modes of the recording signal processing circuit 102 and the servo circuit 106.

The interface circuit 107 detects packet data to be recorded, and outputs the packet data added with time information to the recording signal processing circuit 101. The time information, if sent here added to the data, may be used as is, and if time information has not been added, may-be generated based on the base timing signal generated at the timing signal generating circuit and may be added to packet data. The recording signal processing circuit 102, according to the recording mode decided by the control circuit 104, decides the number of packets to be recorded on a track, separates the added auxiliary information, and generates an error correcting code, ID information, a sub-code, etc. and thus generates a recording signal as shown in FIG. 1, and sends the recording signal to be recorded on the tape 81 by the rotary head 100.

Figure 21:
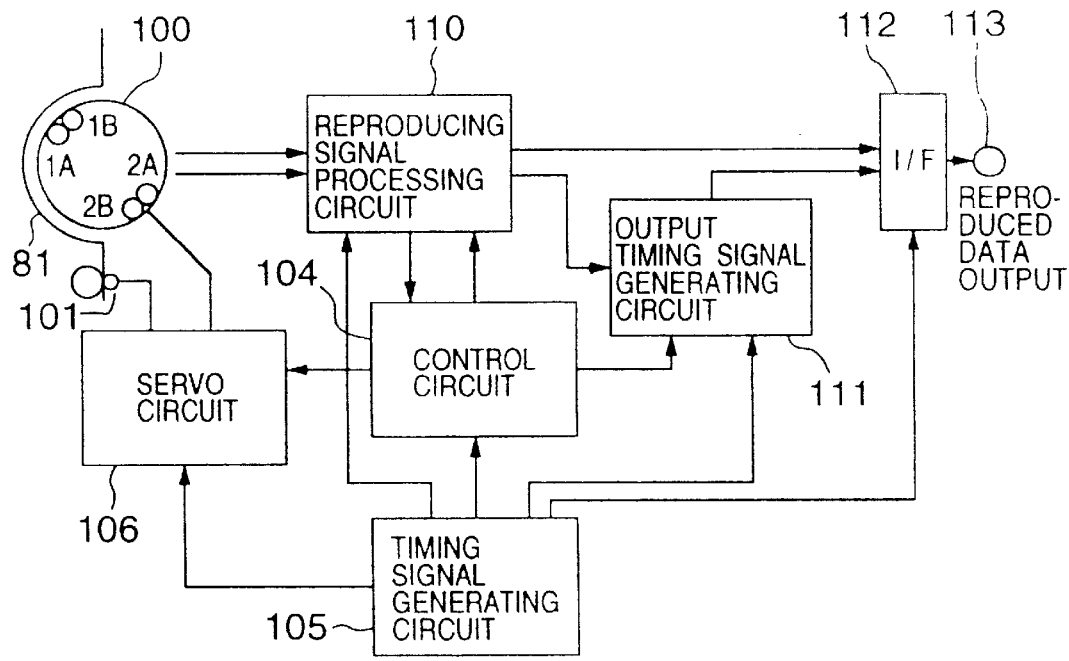
FIG. 21 is a block diagram of the digital signal reproducing apparatus for reproducing a signal recorded by the recording method according to the present invention.

FIG. 21 shows an embodiment of the digital signal reproducing apparatus for reproducing a signal recorded by the recording method according to the present invention. Reference numeral 110 denotes a reproduced signal processing circuit for reproducing data, ID information, etc. from the reproduced signal, 111 denotes an output clock generating circuit for generating an output timing signal for outputting reproduced packet data, and 112 denotes an interface circuit.

In reproduction, a reproduction operation is first performed in an optional playback mode, and ID information is detected. The control circuit 104 decides in what mode data was recorded, and sets the operation modes of the reproduced signal processing circuit 110 and the servo circuit 106 for reproduction. Then, the reproduced signal processing circuit 110 detects a sync signal, and carries out error detection and correction, etc. on the signal reproduced by the rotary head 100, and outputs data, auxiliary data and sub-code to the interface circuit 112. If data was recorded in the time-base compression mode, the tape feed speed is set at 1/the compression rate at the time of recording, the reproduced signal processing circuit 110 re-arranges the reproduced signal in the same order as in recording, on the basis of the track addresses 32 and the block addresses 33, and outputs the signal. The output timing signal generating circuit 111 reproduces an output timing signal exactly in synchronism with the input timing signal of packet data in recording as shown in FIG. 20, and supplies the output timing signal to the interface circuit 112. The interface circuit 112 outputs reproduced data from the output terminal 113 in step with the timing signal generated by the output timing signal generating circuit 111. In outputting data, data and auxiliary data, etc. may be output independently of one another, or may be output multiplexed one over another.

Figure 22A:
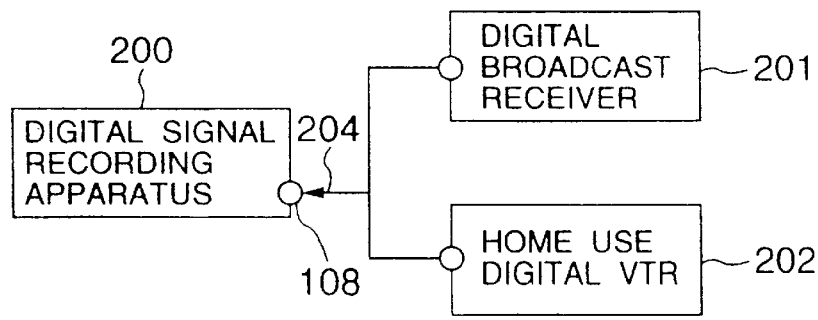
FIG. 22A is a block diagram of the digital signal recording apparatus according to the present invention connected with a digital broadcast receiver and a home use digital VTR.
Figure 22B:
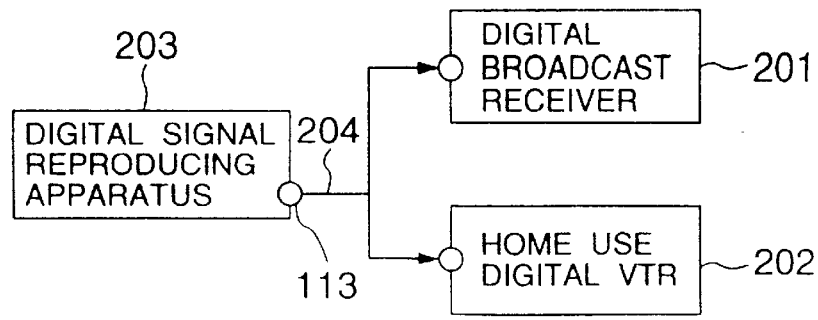
FIG. 22B is a block diagram of the digital signal reproducing apparatus according to the present invention connected with a digital broadcast receiver and a home use digital VTR.

FIGS. 22A and 22B are connection diagrams in which the digital signal recording apparatus 200 in FIG. 19 or the digital signal reproducing apparatus 203 in FIG. 21, each formed according to the present invention, is connected with a digital broadcast receiver 201 and a home use digital VTR 202. FIG. 22A shows connection by which the digital signal recording apparatus 200 records a reproduced signal of the digital broadcast receiver 201 or a reproduced signal of the home use digital VTR 202. A compressed digital video signal or the like received by the digital broadcast receiver 201 or a compressed digital video signal or the like reproduced by the home use digital VTR 202 is input through a signal line 204 to the digital signal recording apparatus 200 and recorded. FIG. 22B shows connection by which a reproduced signal of the digital signal reproducing apparatus is output to the digital broadcast receiver 201 or the home use digital VTR 202. The compressed digital video signal or the like reproduced by the digital signal reproducing apparatus 203 is output to through the signal line 204 to the digital broadcast receiver 201 or the home use digital VTR 202.

The digital broadcast receiver 201 during ordinary reception demodulates the received signal, a compressed digital signal such as MPEG signal for example, decodes this compressed digital signal by a decoder into an ordinary video signal and an audio signal, and outputs them to a TV set or the like. This compressed digital signal is transmitted normally in packet form. The transmission rate of packets varies with the contents of television broadcast. Also, the transmission intervals of packets vary with the method of the decoding process. The decoder decodes the video signal by reproducing the frame frequency in encoding according to information included in data in packet form and the intervals at which the packets arrived.

In recording data from the digital broadcast receiver 201, a compressed digital signal in the packet form is recorded added with time information indicating packet transmission intervals. In reproducing, using this time information, the signal is output to the digital broadcast receiver 201 at the same intervals as in recording. The decoder of the digital broadcast receiver 201 performs the same process on the input signal as in ordinary reception, to decode the video signal and the audio signal, and output those signals to a TV set or the like.

In the home use digital VTR 202, the reproduced compressed digital signal is converted into the same packet form as mentioned above, and transmitted at a fixed rate. The compressed digital signal transmitted from this home use digital VTR 202 is recorded in the recording apparatus 200. In reproducing, the compressed digital signal is output to the home digital VTR 202 at the same rate as in recording. The home use digital VTR 202 converts the input signal into a signal in the recording format of the home use digital VTR.

Note that the digital signal recording apparatus 200 and the digital signal reproducing apparatus 203 may be of a recording-reproducing-combined type, and that the input terminal 108 and the output terminal 113 may both be input/output terminals.

According to the present invention, by controlling the amount of data to be recorded on one track in packet units, and when a recording signal of a different format is used, by changing the recording format on the tape, it is possible to make the apparatus compatible with different transmission rates or different recording signal formats.

Figure 23:
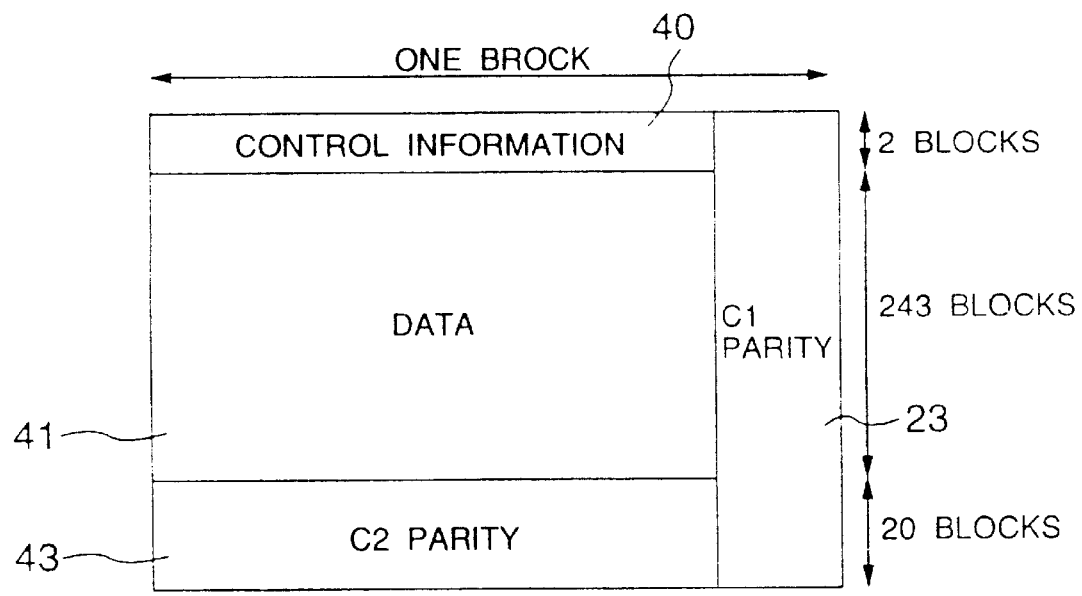
FIG. 23 is another example of composition diagram of data for one track in a data recording area 7.

FIG. 23 shows another example of composition of data for one track in a data recording area 7. The same reference numerals as in FIG. 4 designate the same parts. A sync signal 20 and ID information 21 are omitted. A data recording area 7 consists of 256 blocks, control information 40, such as editing information about the video signal, is recorded in the first two blocks, and the compressed video signal 41 is recorded in the subsequent 234 blocks. Parity data (C2 parity) 43 for error correction is recorded in the last 20 blocks. Parity data 43 is used as follows. For example, 236 blocks of data are divided into two groups, even-number blocks and odd-number blocks, and 118 bytes each of the two groups are added with ten parity bytes each.

Figure 24:
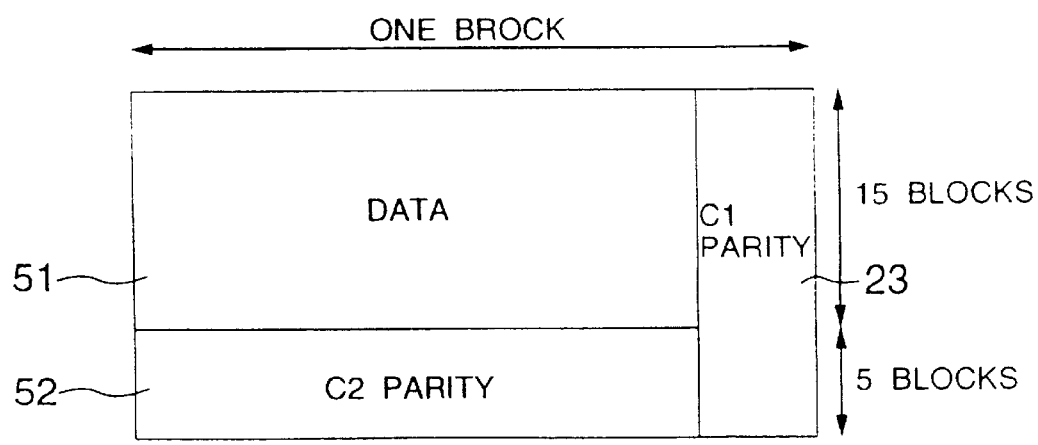
FIG. 24 shows the composition of data for one track in a auxiliary data recording area 3.

FIG. 24 shows the composition of data for one track in an auxiliary data recording area 3. A sync signal 20 and ID information 21 are omitted. An auxiliary data recording area 3 consists of 20 blocks, and information 51 related to the video signal, such as the audio signal, is recorded in 15 bytes, and parity bytes (C2 parity) 52 are recorded in the subsequent five blocks. Parity data 52 is used as follows. For example, ten parity bytes are added to 30 bytes of 15 blocks of auxiliary data, the 30 bytes being a sum by adding up two bytes from each of the 15 blocks. By this arrangement, C2 parity data in an auxiliary data recording area has the same composition as in a data recording area 7, so that it is possible to use a common parity check process.

Figure 25:
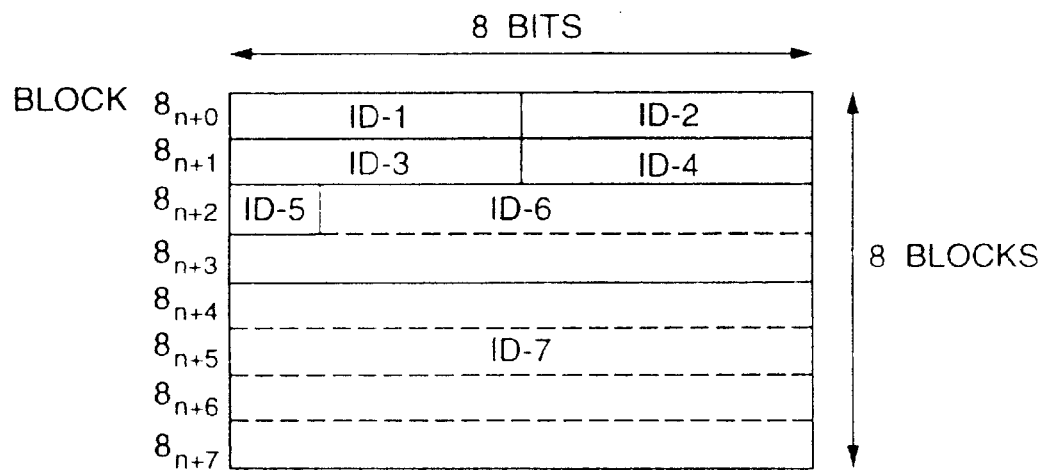
FIG. 25 shows the composition of ID data 34 in a data recording area 7.

FIG. 25 shows the composition of ID data 34 in a data recording area 7. ID data 34 provides a piece of information formed by eight bytes from eight blocks. By multiplex-recording this ID data 32 times in 256 blocks, the detection performance in reproduction is improved. Data of eight blocks includes seven kinds of data, ID-1 to ID-7.

ID-1 indicates the recording format of a data recording area 7. In other words, by changing the value of ID-1, ID-1 can handle a plurality of kinds of formats.

ID-2 indicates recording modes, hence it indicates the maximum recording rate. In this embodiment, when two-channel recording is performed by a rotary head with four heads at the rotating speed of 1800 rpm, data can be recorded at a speed of about 25 Mbps (more precisely, 25.15968 Mbps). In this embodiment, the recording pattern on track and the recording modes are the same as in FIGS. 8, 9A, 9B and 9C.

ID-3 indicates a time base compression mode, hence, a time base compression rate in recording. This mode is applicable to a system in which a digital signal is transmitted in a short time by compressing the time base, and after recording, the signal is reproduced by expanding the time base. For example, "1" is set when time base is not compressed, "2" is set when the time base compression rate is twice higher than normal, and "3" is set when the time base compression rate is four times higher than normal.

ID-4 indicates the number of channels of data. For example, in recording mode 1, data of 12.5 Mbps can be recorded in two channels.

ID-5 indicates whether or not the recording rate of data is synchronism with the speed of the rotary head. For example, when the recording rate is synchronized with the speed of the rotary head, "1" is set, and if not, "0" is set. When the recording rate is synchronized with the speed of the rotary head, the amount of data recorded on each track can be made constant, and if not, the recording rate needs to be varied the track format.

ID-6 indicates the amount of data recorded on one track. For example, when data of 12 Mbps is recorded, the recording mode 2 is selected, and 25000 bytes of data are on one track. If the rate of data is not synchronized with the speed of the rotary head, it is required to control the amount of data in frame units.

ID-7 has information related to recording data, such as the kind etc. of data.

By controlling the recording mode and the amount of data to be recorded on one track according to the transmission rate of data to be recorded, efficient recording can be performed by a simple recording/reproducing process. In reproducing, it is required to first detect ID data 34 to find the recording mode, and set the reproducing processing circuit in that mode for reproduction.

Figure 26:
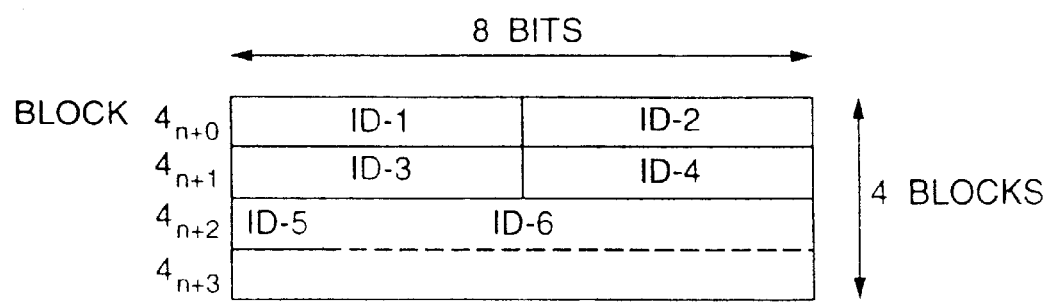
FIG. 26 shows the composition of ID data 34 in an auxiliary data recording area 3.

FIG. 26 shows the composition of ID data 34 in an auxiliary data recording area 3. ID data 34 provides a piece of information formed by four bytes from four blocks. By multiplex-recording this information in 20 blocks five times, the detection performance in reproduction is improved. Four blocks of data consist of six kinds of data, ID-1 to ID-6 in the same arrangement as in FIG. 25.

In an auxiliary data recording area 3, auxiliary data can be recorded at about 1.6 Mbps (more precisely 1.6128 Mbps) in the recording mode 1. For example, PCM audio signal can be recorded in two channels at a quantization frequency of 48 kHz and at a quantization bit number of 16 bits.

ID data 34 of a sub-code recording area 12 has recorded therein a start flag to indicate the start of a program, a flag for a skip reproduction, etc. Unlike in a data recording area 7 and an auxiliary data recording area 3, the same data is recorded in a sub-code recording area 12 in all blocks in one frame. In this way, the detection performance in high-speed search or the like can be improved.

Figure 27:
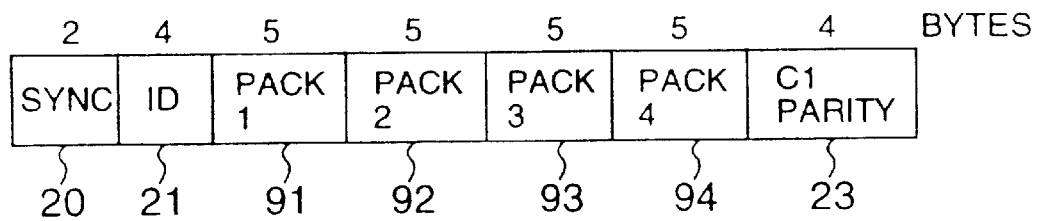
FIG. 27 is a diagram showing a recording pattern on the tape.

FIG. 27 shows the composition of data 22 in a sub-code recording area 12. In FIG. 27, data is recorded in packs 91, 92, 93 and 94, each pack being five bytes long. Parity data 23 consists of four bytes.

Figure 28:
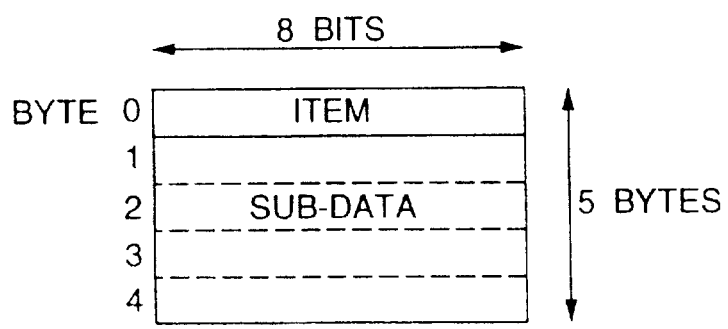
FIG. 28 shows the composition of any of the packs 91 to 93.
Figure 29:
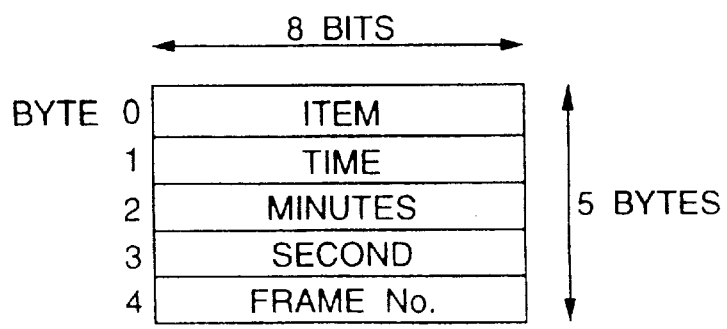
FIG. 29 shows the composition of a pack when time data is recorded.

FIG. 28 shows the composition of each of the packs 91 to 94. Byte 0 is an item to show the contents of information to be recorded in a pack. By switching over the item, a plurality of kinds of information can be recorded. FIG. 29 shows an example of the composition of a pack when time information is recorded.

Figure 30:
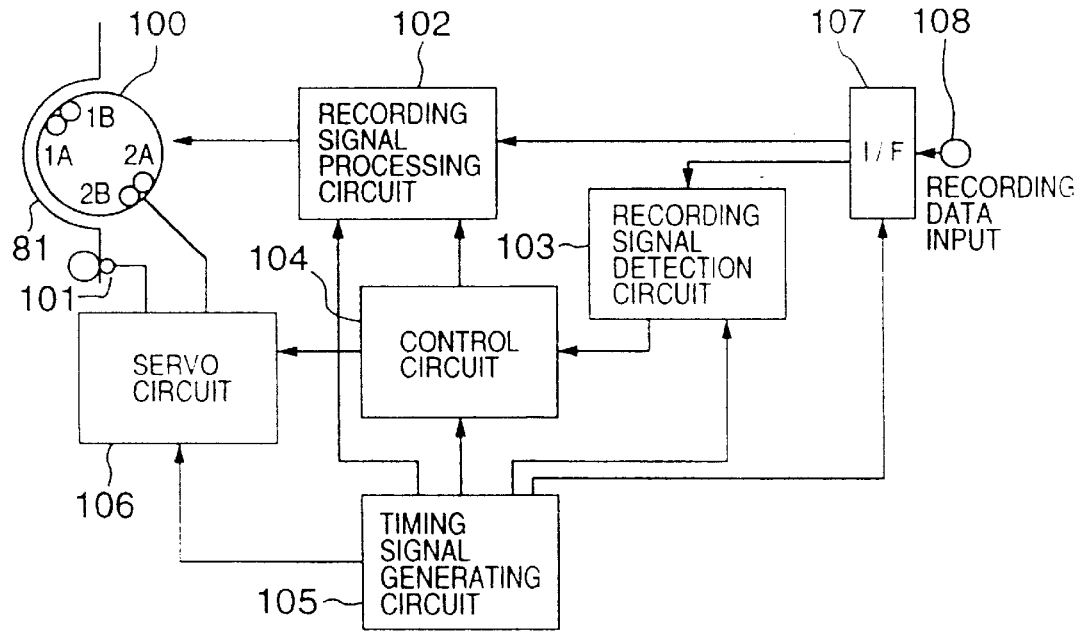
FIG. 30 is a block diagram of another embodiment of the digital signal recording apparatus for recording by the recording method according to the present invention.

FIG. 30 shows an embodiment of the digital signal recording apparatus for recording by the recording method according to the present invention. Reference numeral 100 denotes a rotary head, 101 denotes a capstan, 102 denotes a recording signal processing circuit for generating a recording signal shown in FIG. 1, 103 denotes a recording signal detection circuit to detect the transmission rate, kind, etc. of a recording signal, 104 denotes a control circuit, such as a microprocessor, to control the recording mode, etc. according to a result of detection in the recording signal detection circuit 103, 105 denotes a timing signal circuit to generate a timing signal as the basis for rotation, etc. of the rotary head 100, 106 denotes a servo circuit to control the speeds of the rotary head and tape feed, and 107 denotes an interface circuit.

Recording data supplied from the input terminal 108 is input through the interface circuit 107 to the recording signal processing circuit 102 and the recording signal detection circuit 103. The recording signal detection circuit 103 detects the transmission rate, kind, etc. of the signal from information added to the recording data or from the signal rate and outputs detection results to the control circuit 104. The control circuit decides the mode in which data was recorded from the detection results, and sets the operation modes of the recording signal processing circuit 102 and the servo circuit 106. Note that in the synchronized mode, though omitted from the figure, the timing signal generating circuit 105 outputs a sync clock, and in step with the sync clock, data is input. The recording signal processing circuit 102, according to the recording mode decided by the control circuit 104, separates the auxiliary data, and generates an error correcting code, ID information, sub-code, etc., generates a recording signal shown in FIG. 1, and sends the recording signal to be recorded on a tape 81 by the rotary head 100.

Figure 31:
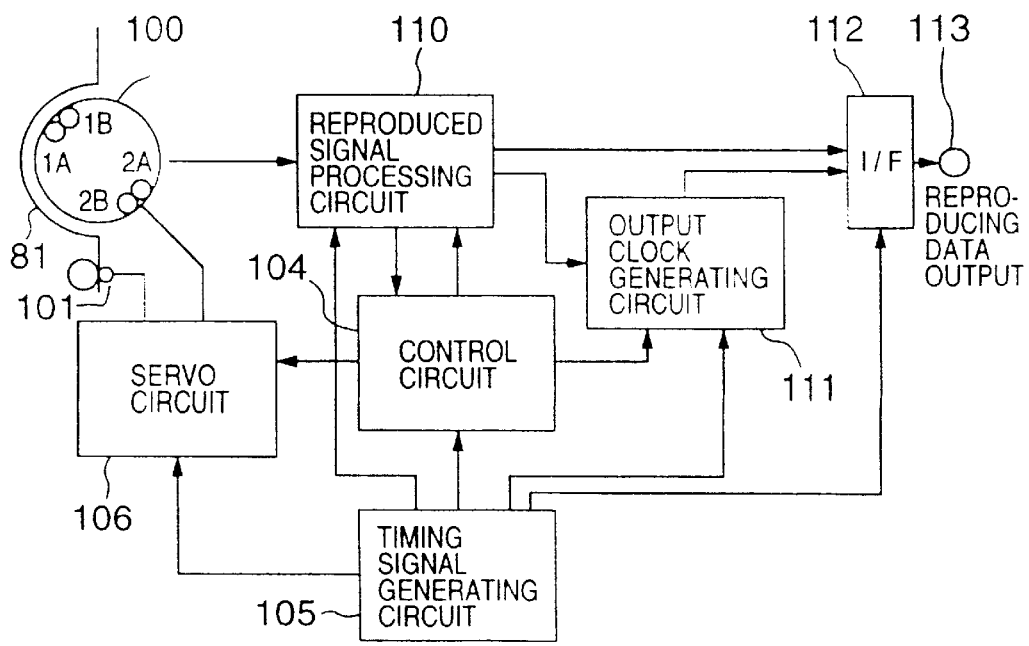
FIG. 31 is a block diagram of another embodiment of the digital signal reproducing apparatus for reproducing a signal recorded by the recording method according to the present invention.

FIG. 31 shows an embodiment of the digital signal reproducing apparatus for reproducing a signal recorded by the recording method according to the present invention. Reference numeral 110 denotes a reproduced signal processing circuit for reproducing data, ID data, etc. from the reproduced signal, 111 denotes an output clock generating circuit for generating a clock signal to output the reproduced data, and 112 denotes an interface circuit.

In reproducing, a reproducing operation is performed in an optional playback mode, and ID data is detected by the reproduced signal processing circuit 110. And, the control circuit 104 decides the mode in which data was recorded, and sets the operation modes of the reproduced signal processing circuit 110 and the servo circuit 106 again for reproduction. The reproduced signal processing circuit 110 detects a sync signal, carries out error detection and correction, etc. on the signal reproduced by the rotary head 100, and reproduces data, auxiliary data and a sub-code to output to the interface circuit 112. If the data was recorded in the time base compression mode, the tape feed speed is set at 1/the compression rate at the time of recording, and the reproduced signal processing circuit 110 re-arranges the reproduced signal in the same order as in recording, on the basis of the track addresses 32 and the block addresses 33, and outputs the signal. The output clock generating circuit 111 reproduces a clock in synchronism with the transmission rate of data at the time of recording, by means of PLL or the like on the basis of the amount of data recorded on the track, and supplies the clock signal to the interface circuit 112. The interface circuit 112 outputs reproduced data from the output terminal 113 in step with clock pulses generated by the output clock generating circuit 111. In outputting data, data and auxiliary data, etc. may be output independently of one another, or may be output multiplexed one over another.

According to the present invention, by adding a first control signal to specify the recording mode, and a second control signal to specify the number of data recorded on one track or in one frame, and by controlling the recording mode and the amount of data recorded on one track according to the transmission rate of data to be recorded, efficient recording of a signal of an optional transmission rate can be carried out by a simple recording/reproducing process.

Description will now be made of a recording method and a recording apparatus for recording a digital signal as well by utilizing a conventional analog VTR. As described earlier, the rotating speed of the rotary head of an analog VTR is 1800 rpm, and an oxide recording tape is used, and therefore the analog VTR is unable to record a digital signal of 20 Mbps or higher by its current mechanism. In this embodiment, by using at least four magnetic heads, a compressed digital video signal of 25 Mbps and a digital audio signal of 1.6 Mbps are recorded on a magnetic tape at a recording rate of 20 Mbps or less. Since, in the following description, the form of the recording signal is the same as in the embodiment described above, and its description is omitted.

Figure 32:
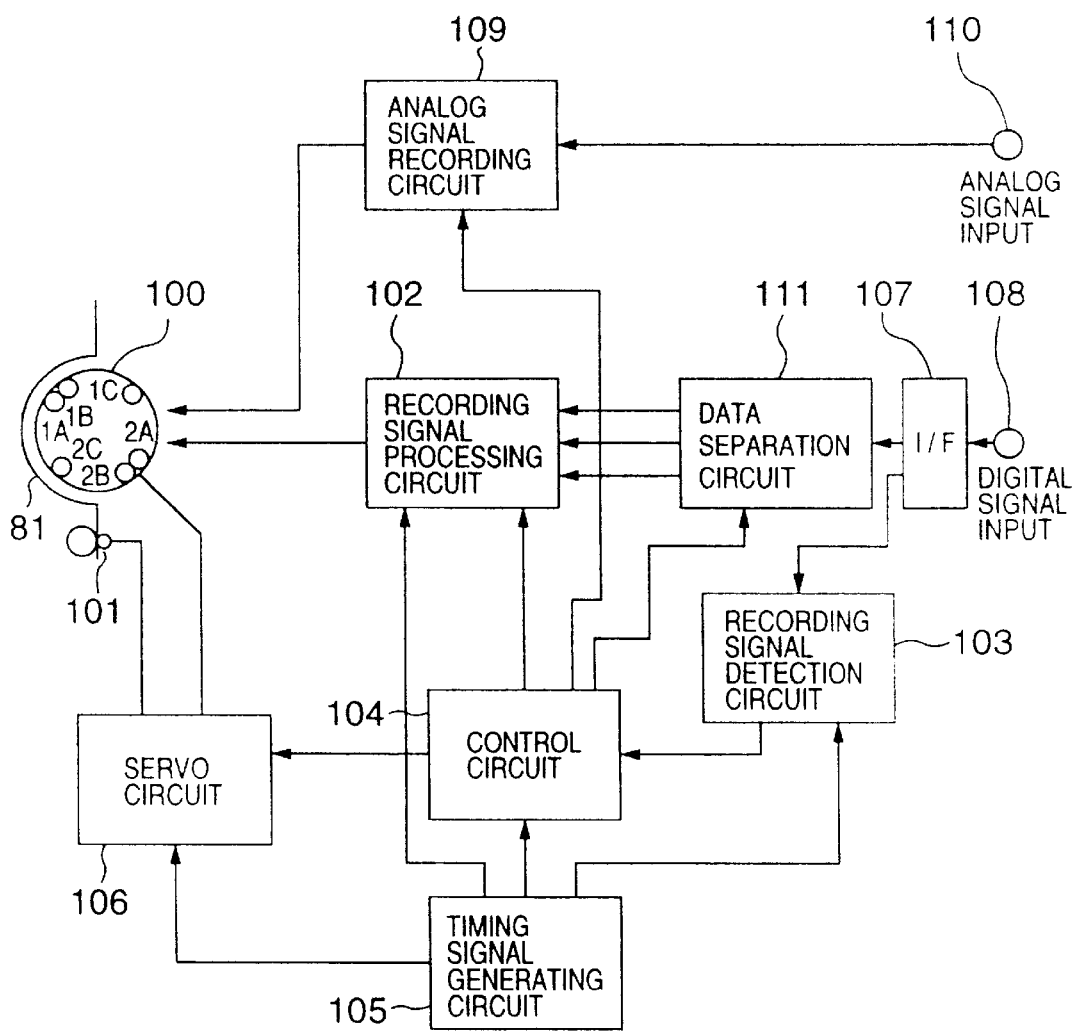
FIG. 32 is a block diagram of a further embodiment of the digital signal recording apparatus for recording by the recording method according to the present invention.

FIG. 32 shows an embodiment of an analog/digital signal recording apparatus for recording by the recording method according to the present invention. Reference numeral 100 denotes a rotary head, and 1A, 1B, 2A and 2B denote heads for recording digital signal, 1C and 2C denote heads for recording a conventional analog video signal. Reference numeral 101 denotes a capstan, 102 denotes a recording signal processing circuit for generating a recording signal in FIG. 1, 103 denotes a recording signal detection circuit for detecting the transmission rate, kind, etc. of the recording signal, 104 denotes a control circuit, such as a microprocessor, for controlling the recording mode, etc. according to detection results of the recording signal detection circuit, 105 denotes a timing signal generating circuit for generating a timing signal as the basis for the rotation of the rotary head 100, for example, 106 denotes a servo circuit for controlling the rotary head speed and the tape feed speed, 107 denotes an interface circuit, 109 denotes an analog video signal recording circuit, and 111 denotes data separation circuit.

A recording signal input from an input terminal is supplied to through the interface circuit 107 to the data separation circuit 111 and the recording signal detection circuit 102. The recording signal detection circuit 102 detects the kind, etc. of signal from information added to the recording data, for example. The control circuit 104 decides the mode in which data was recorded from detection results, and sets the operation modes of the recording signal processing circuit 102, the data separation circuit 111, and the servo circuit 106. Note that in the synchronized mode, though omitted from the figure, the timing signal generating circuit 105 outputs a sync clock, and in step with the sync clock, data is input. When input data is a signal from a home use digital VTR, the data separation circuit 111 separates the recording data into a video signal, an audio signal and other control signals, and inputs them to the recording signal processing circuit 102. The recording signal processing circuit 102, according to the recording mode decided by the control circuit 104, generates an error correcting code, ID data, sub-code, etc., and generates a recording signal shown in FIG. 1, and sends the recording signal to be recorded on a tape 81 by the digital recording heads 1A, 1B, 2A and 2B on the rotary head 100.

When a conventional analog video signal is recorded, an analog video signal input from the input terminal 110 is subjected to a specified process in the analog recording circuit 109, and recorded on a tape 81 by the analog recording heads 1C and 2C on the rotary head 100. Note that, though not shown in the figure, whether the recorded signal is digital or analog can be decided at the time of reproduction by an identification signal, which is to be recorded in an area where a CTL signal for tracking is recorded.

Figure 33:
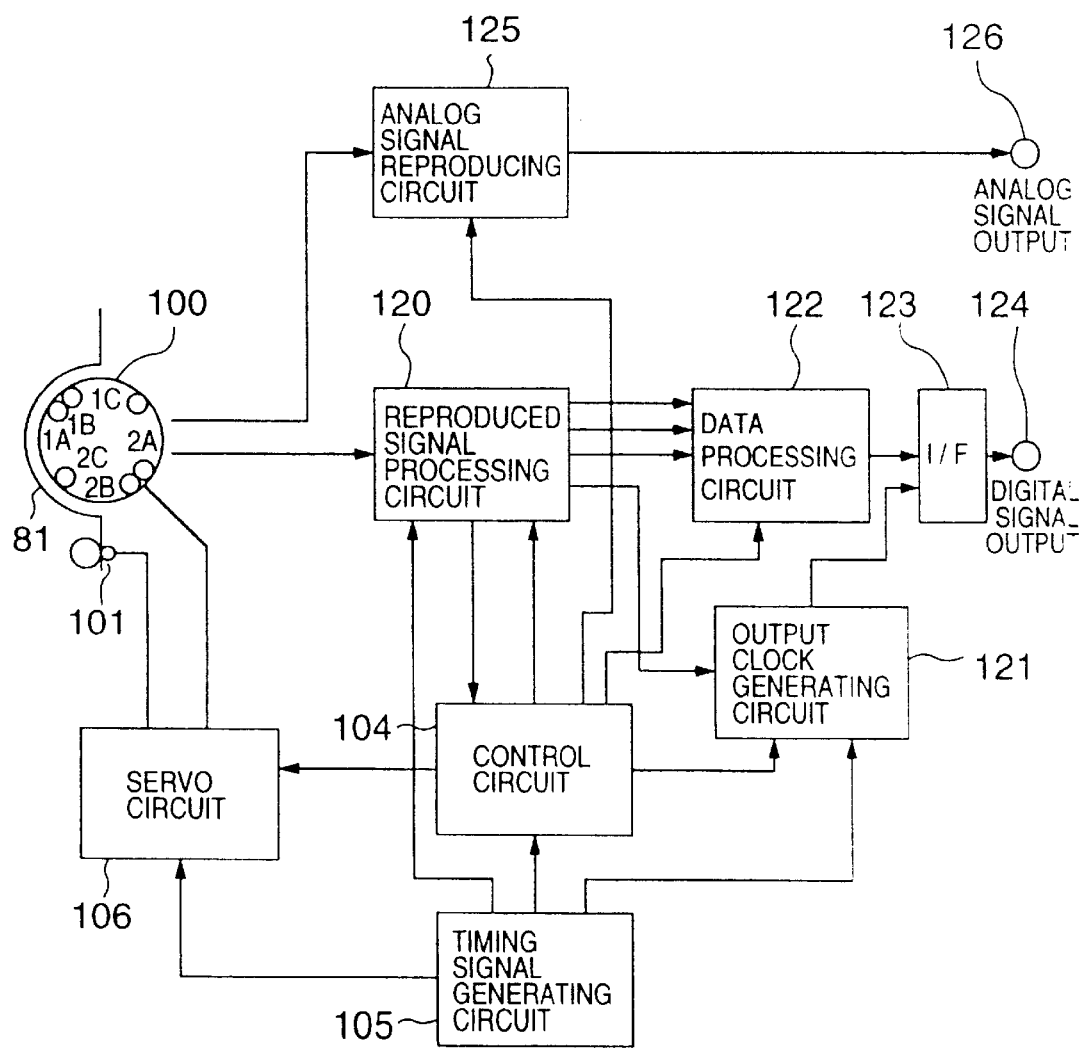
FIG. 33 is a block diagram of a further embodiment of the digital signal reproducing apparatus for reproducing a signal recorded by the recording method according to the present invention.

FIG. 33 shows an embodiment of an analog/digital signal reproducing apparatus for reproducing a signal recorded by the recording method according to the present invention. Reference numeral 120 denotes a reproduced signal processing circuit for reproducing data, ID data, etc. from the reproduced signal, 121 denotes an output clock generating circuit for generating a clock whereby to output the reproduced data, 122 denotes a data processing circuit, 123 denotes an interface circuit, and 125 denotes an analog signal reproducing circuit.

In reproducing, whether the recorded signal is analog or digital is detected by an identification signal recorded in the CTL signal recording area. If the recorded signal is digital, a reproduction operation is performed in an optional playback mode, and ID data is detected by the reproduced signal processing circuit 120. The control circuit 104 decides in what mode data was recorded, and sets again the operation modes of the reproduced signal processing circuit 120 and the servo circuit 106 for reproduction. The reproduced signal processing circuit 120, from the signal reproduced by the digital recording heads 1A, 1B, 2A and 2B on the rotary head 100, detects a sync signal, performs error detection and correction, reproduces data, auxiliary data, and sub-code and outputs them to the data processing circuit 122. The data processing circuit 122 restores the reproduced signal to a format of signal when it was recorded, and sends it to the interface circuit 112. If the data was recorded in the time base compression mode, the tape feed speed is set at 1/the compression rate at the time of recording, and the reproduced signal processing circuit 120 re-arranges the reproduced signal in the same order as in recording, on the basis of the track addresses 32 and the block addresses 33, and outputs the signal. The output clock generating circuit 121 reproduces a clock in synchronism with the transmission rate of data at the time of recording, by means of PLL or the like on the basis of the amount of data recorded on the track, and supplies the clock signal to the interface circuit 123. The interface circuit 123 outputs reproduced data from the output terminal 124 in step with clock pulses generated by the output clock generating circuit 121. In outputting data, data and auxiliary data, etc. may be output independently of one another, or may be output multiplexed one over another.

When reproducing a conventional analog signal, the analog signal reproducing circuit 125 carries out a specified process on the signal reproduced by the analog recording heads 1C and 2C on the rotary head 100, and outputs the signal from the output terminal 126.

Figure 34A:
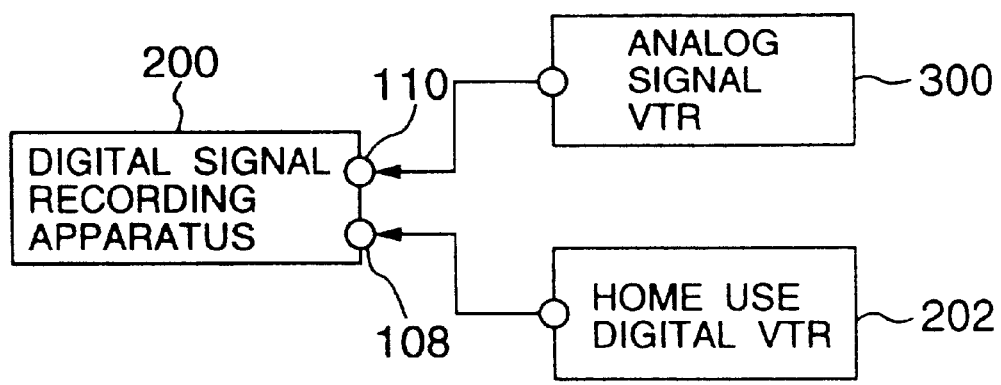
FIG. 34A is a connection diagram of the digital signal recording apparatus in FIG. 32 connected with a conventional analog recording VTR and a home use digital VTR.
Figure 34B:
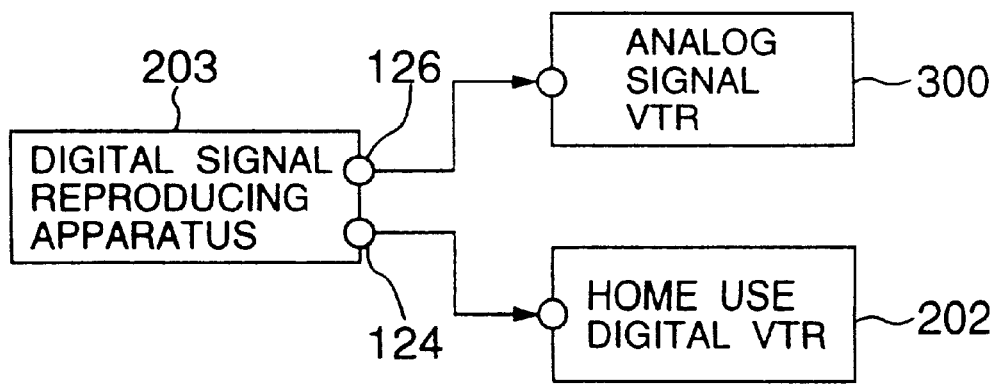
FIG. 34B is a connected diagram of the digital signal reproducing apparatus in FIG. 33 connected with a conventional analog recording VTR and a home use digital VTR.

FIGS. 34A and 34B are connection diagrams, in which the digital signal recording apparatus in FIG. 32 or the digital signal reproducing apparatus is with a conventional analog recording VTR and a home use digital VTR. FIG. 34A shows connection by which either a reproduced signal of a conventional analog recording VTR 300 or a reproduced signal of a home use digital VTR 202 is recorded in a digital signal recording apparatus 200, while FIG. 34B shows connection by which a reproduced signal of a digital signal reproducing apparatus 203 is recorded in a conventional analog recording VTR 300 or a home use digital VTR 202. The digital signal recording apparatus 200 and the digital signal reproducing apparatus 203 may be of a recording-reproducing-combined type. The input terminal 108 and the output terminal 124 may both be input/output terminals.

According to the present invention, a compressed digital video signal of 25 Mbps and a digital audio signal of 1.6 Mbps can be recorded at a recording rate of 20 Mbps or less, and Therefore, it is possible to record a compressed digital video signal and a digital audio signal recorded in a home use digital VTR by a conventional analog VTR, so that a VTR compatible with analog and digital signals can be realized.

What is claimed is:

1. A digital signal recording method for generating blocks of data by adding a sync signal, control signals and an error correcting code to b bytes (b being a positive integer) of digital signal of a packet type in which a packet is formed by a bytes of data (a being a positive integer), and recording said blocks on a magnetic recording medium, said method comprising the steps of:

recording a specified number of said blocks in each of respective signal recording unit areas on said magnetic recording medium; and recording data by arranging m pieces of said packets in n pieces of said blocks by setting values of said a and b so that a:b=n:m (where n<a and m<b).

2. A method according to claim 1, wherein said packet of a bytes includes packet data and auxiliary information related to said packet data.

3. A method according to claim 2, wherein said auxiliary information includes information about time when said packet data was input.

4. A method according to claim 2, wherein said packet data is a digital video signal, and wherein said auxiliary information includes information for identifying said digital signal.

5. A method according to claim 1, wherein after each packet having a number of bytes smaller than a is converted into a packet formed by a bytes, said blocks are formed and recorded on said recording medium.

6. A method according to claim 1, wherein n=5 and m=2 are set.

7. A method according to claim 1, wherein n=4 and m=3 are set.

8. A digital signal recording method for generating blocks of data by adding a sync signal, control signals and an error correcting code to b bytes (b being a positive integer) of digital signal of a packet type in which a packet is formed by a bytes of data (a being a positive integer), and recording said blocks on a magnetic recording medium, said method comprising the step of:

recording a specified number of said blocks in each of respective signal recording unit areas on the magnetic recording medium, wherein said control signals include information for identifying a number a of bytes of each said packet to be recorded in said signal recording unit area.

9. A method according to claim 8, wherein said control signals include information indicating the number of packets to be recorded in said signal recording unit area.

10. A digital signal recording apparatus for generating blocks of data by adding a sync signal, control signals and an error correcting code to b bytes (b being a positive integer) of digital signal of a packet type, in which a packet is formed by a bytes of data (a being a positive integer), and recording said blocks on a magnetic recording medium, said apparatus comprising:

recording means for recording a specified number of said blocks in each of respective signal recording unit areas on said magnetic recording medium, and recording data on said recording medium by arranging m pieces of said packets in n pieces of said blocks by setting values of said a and b so that a:b=n:m (where n<a and m<b).

11. Apparatus according to claim 10, further comprising control means having a first operating mode in which data are recorded by arranging m pieces of packets in n pieces of said blocks, and a second operating mode in which data are recorded by arranging m' pieces of packets (m'<a) in n' pieces of said blocks (n'<b).

12. Apparatus according to claim 11, wherein said recording means includes means for determining a recording mode by identifying a type of said packets, from the digital signal.

13. A digital signal recording apparatus generating blocks of data by adding a sync signal, control signals and an error correcting code to b bytes (b being a positive integer) of digital signal of a packet type, in which a packet is formed by a bytes of data (a being a positive integer), and recording said blocks on a magnetic recording medium, said apparatus comprising:

recording means for recording a specified number of said blocks in each of respective signal recording unit areas on said magnetic recording medium, wherein said recording means implements control such that said packets input to said apparatus in a specified period are arranged in said signal recording unit area, and adds as said control signal information indicating at least a number of packets to be recorded in said signal recording unit area to said digital signal.

14. Apparatus according to claim 13, wherein said control signals include information for identifying a byte number n of each said packet.

15. A digital signal recording method for generating a block by adding a sync signal, a control signal and an error correcting code to m bytes out of n bytes of a digital signal formed by adding $n_2$ bytes of auxiliary information to $n_1$ bytes of digital signal of a packet type, forming a digital signal recording area with a predetermined number of the blocks, and recording said blocks on a magnetic recording medium, said $n_1$ and $n_2$ being positive integer numbers, said method comprising the steps of:

setting a ratio of n to m at n':m', wherein n' and m' are integers, n'<n and m'<m; and recording data by arranging m' pieces of said packets in n' pieces of blocks in said digital signal recording area.

16. A method according to claim 15, wherein said auxiliary information represents a time when said packet data is transmitted.

17. An apparatus for recording a digital signal, wherein a block format is generated by adding a sync signal, a control signal and an error correcting code to m bytes out of n bytes of a digital signal formed by adding $n_2$ bytes of auxiliary information to $n_1$ bytes of digital signal of a packet type, a digital signal recording area being formed with a predetermined number of the blocks which are recorded on a magnetic recording medium, $n_1$ and $n_2$ being positive integers, said apparatus comprising:

recording means for setting a ratio of n to m at n':m' wherein n' and m' are integers, n'<n and m'<m; and means for recording data by arranging m' pieces of said packets in n' pieces of blocks in said digital signal recording area.

18. An apparatus according to claim 17, wherein said recording means includes means for adding said $n_2$ bytes of auxiliary information, which includes information indicating a time of transmission of said packet data, to said $n_1$ bytes of packet.

19. A digital signal recording apparatus for generating blocks of data by adding a sync signal, control signal and an error correcting code to b bytes (b being a positive integer) of digital signal of a packet type, in which a packet is formed by a bytes of data (a being a positive integer), and recording said blocks on a magnetic recording medium, said apparatus comprising:

a recording circuit which generates a specified number of said blocks in each of respective signal recording unit areas on said magnetic recording medium, and records data on said recording medium by arranging m pieces of said packets in n pieces of said blocks by setting values of said a and b so that a:b=n:m (where n<a and m<b); and a recording head which is coupled to said recording circuit and records said blocks of data on said recording medium.

20. An apparatus according to claim 19, further comprising a control circuit which controls said recording circuit and has a first operating mode in which data are recorded by arranging m pieces of packets in n pieces of said blocks, and a second operating mode in which data are recorded by arranging m' pieces of packets (m'<a) in n' pieces of said blocks (n'<b).

21. An apparatus according to claim 20, wherein said recording circuit includes a circuit which determines a recording mode by identifying a type of said packets from the digital signal.

22. A digital signal recording apparatus generating blocks of data by adding a sync signal, control signals and an error correcting code to b bytes (b being a positive integer) of digital signal of a packet type, in which a packet is formed by a bytes of data (a being a positive integer), and recording said blocks on a magnetic recording medium, said apparatus comprising:

a recording circuit which generates a specified number of said blocks in each of respective signal recording unit areas on said magnetic recording medium, wherein said recording circuit implements control such that said packets input to said apparatus in a specified period are arranged in said signal recording unit area, and adds as said control signal information indicating at least a number of packets to be recorded in said signal recording unit area to said digital signal; and a recording head which is coupled to said recording circuit and records said blocks of data on said recording medium.

23. An apparatus according to claim 22, wherein said control signals include information for identifying a byte number n of each said packet, n being an integer.

24. An apparatus for recording a digital signal, wherein a block format is generated by adding a sync signal, a control signal and an error correcting code to m bytes out of n bytes of a digital signal formed by adding $n_2$ bytes of auxiliary information to $n_1$ bytes of digital signal of a packet type, a digital signal recording area being formed with a predetermined number of the blocks which are recorded on a magnetic recording medium, $n_1$ and $n_2$ being positive integers, said apparatus comprising:

a control circuit which sets a ratio of n to m at n':m' wherein n' and m' are integer, n'<n and m'<m; and a recording circuit which is controlled by said control circuit, and which records data by arranging m' pieces of said packets in n' pieces of blocks in said digital signal recording area.

25. An apparatus according to claim 24, wherein said recording circuit includes a circuit which adds said $n_2$ bytes of auxiliary information, which includes information indicating a time of transmission of said packet data, to said $n_1$ bytes of packet.

* * * * *